United States Patent [19]
Hinton et al.

[11] Patent Number: 5,870,599
[45] Date of Patent: Feb. 9, 1999

[54] COMPUTER SYSTEM EMPLOYING STREAMING BUFFER FOR INSTRUCTION PREETCHING

[75] Inventors: Glenn J. Hinton, Portland; Ashwani K. Gupta, Beaverton; Sunil R. Shenoy, Portland, all of Oreg.

[73] Assignee: Intel Corporation, Santa Clara, Calif.

[21] Appl. No.: 953,226

[22] Filed: Oct. 17, 1997

Related U.S. Application Data

[63] Continuation of Ser. No. 548,699, Oct. 26, 1995, abandoned, which is a continuation of Ser. No. 205,034, Mar. 1, 1994, abandoned.

[51] Int. Cl.[6] .............................. G06F 9/00; G06F 12/00
[52] U.S. Cl. ........................ 395/586; 711/207; 395/585
[58] Field of Search ..................... 395/586, 585; 711/207

[56] References Cited

U.S. PATENT DOCUMENTS

| | | | |
|---|---|---|---|
| 4,464,712 | 8/1984 | Fletcher ................................. | 711/122 |
| 4,594,659 | 6/1986 | Guenther et al. ....................... | 395/383 |
| 4,797,814 | 1/1989 | Brenza ...................................... | 711/3 |
| 4,953,073 | 8/1990 | Moussouris et al. ..................... | 711/3 |
| 5,027,270 | 6/1991 | Riordan et al. .......................... | 711/140 |
| 5,261,066 | 11/1993 | Jouppi et al. ........................... | 711/122 |
| 5,548,776 | 8/1996 | Colwell et al. .......................... | 395/393 |
| 5,758,112 | 5/1998 | Yeager et al. ............................ | 395/393 |

OTHER PUBLICATIONS

Gonzalez et al.; Reducing Branch Delay to Zero in Pipeline Processors; pp. 363–371, Mar. 1993.

Jouppi; Improving Direct Mapped Cache Performance by the Addition of a Small Fully Associative Cache and Prefetch Buffers; pp. 364–373, Aug. 1990.

"Superscalar Microprocessor Design" by Mike Johnson, Advanced Micro Devices, Prentice Hall, 1991.

"The Metaflow Architecture", pp. 10–13 and 63–73, by Val Popescu, Merle Schultz, John Spracklen, Gary Gibson, Bruce Lightner, and David Isaman, IEEE Micro, 1991.

*Primary Examiner*—Parshotam S. Lall
*Assistant Examiner*—Kenneth R. Coulter
*Attorney, Agent, or Firm*—Blakely, Sokoloff, Taylor & Zafman LLP

[57] ABSTRACT

Streaming buffer renaming for memory accesses issued by a microprocessor to an external memory via a system bus allows up to N fetch accesses at any one time for M physical streaming buffer locations, where N is greater than M. When a fetch within the processor misses the instruction cache, the fetch address is placed in the streaming buffer. When the data has been fetched from the external memory, it is returned to the streaming buffer and placed into one of the M physical buffer locations. The data within the streaming buffer is returned to the instruction cache of the processor only if it is to be used in accordance with the computer program being executed.

36 Claims, 6 Drawing Sheets

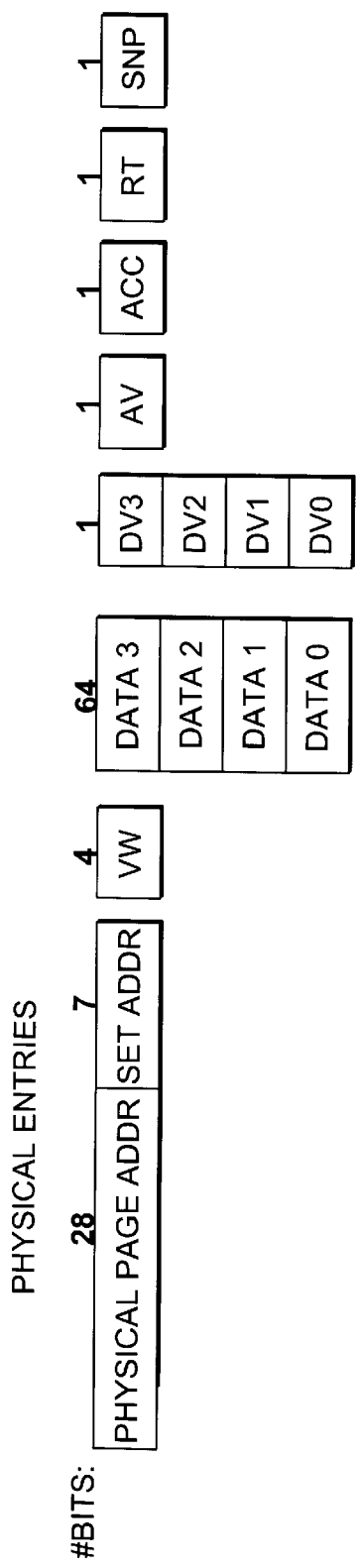

COMPUTER SYSTEM EMPLOYING STREAMING BUFFER FOR INSTRUCTION PREETCHING

This is a continuation of application Ser. No. 08/548,699, filed Oct. 26, 1995, now abandoned, which is a continuation of application Ser. No. 08/205,034, filed Mar. 1, 1994 now abandoned.

FIELD OF THE INVENTION

The present invention relates generally to the field of computer systems. More specifically, the present invention relates to memory accessing operations in computer systems, including the fetching of data and instructions from a memory external to a data processing device.

BACKGROUND OF THE INVENTION

Cache memory has been in existence for many years. Modern cache memories are designed to take advantage of the locality of temporal reference as well as the locality of spatial reference. This means that once an operand has been referenced from memory, either the same operand, or other operands nearby in the memory are often referenced a short time later. Recognizing the value of cache memories, practitioners have developed ever more complex, hierarchical memory systems. For example, today it is quite common to find commercially-available computer systems having two or more cache memories.

It is important to understand that caches exist in the context of a memory hierarchy within a computer system. Usually, there is small but very fast local cache memory coupled to a microprocessor or central processing unit (CPU). Often the local cache memory is incorporated on the same integrated circuit as the microprocessor itself. If the processor attempts to access a memory reference, and the access to the local cache misses, then the access is passed on to a bigger, but slower, secondary memory.

Very often, computer systems employ a secondary cache in the memory hierarchy, interposed between the local cache memory and a third level memory. The third level memory usually consists of another cache memory or the system's main memory (e.g., DRAM or a rigid disk drive). In the case where an access misses both the local and secondary caches, the access ends up at the third level cache (or main memory).

Some computer systems also employ a separate instruction cache, which is a fast, local memory that holds instructions to be executed. When a program tries to access instruction data that is not yet (or no longer) in the instruction cache, the processor unit must wait until the desired instruction or instructions are fetched from a higher level of memory within the memory hierarchy. By way of example, if an access to the instruction cache misses, a memory access is then generated to the secondary cache level, or to main memory.

Fetching refers to the act of extracting instructions to be executed from the memory hierarchy, including cache memories. In many cases, a computer system employs an instruction fetch unit that is responsible for deciding which instruction cache entry ought to be accessed next to maximize program performance.

Besides cache memories, another microarchitecture design technique for improving performance is pipelining. Pipelining divides the execution of an instruction into sequential steps, using different microarchitectural resources at each step. One of the defining characteristics of pipelined computer machines is that they have several different instructions all executing at the same time, but usually at different stages in the machine. The particular parts of the execution process within the pipeline are often referred to as pipestages.

Pipelined machines must fetch the next instructions in a program flow before they have completed the previous instructions. This means that if the previous instruction was a branch, then the next instruction fetch could be to the wrong place. Branch prediction is a computer system technique that attempts to infer the proper next instruction address, knowing only the current address. Branch prediction typically utilizes an associative memory called a branch target buffer.

An associative memory is a table that is accessed not via an explicit index, but by the data it contains. If no entries of the associative memory match the input data, a "miss" signal is asserted. If any entries of the associative memory match the input data, the associative memory indicates the match, and produces any related data that was stored with that entry. Branch target buffers typically comprises a small associative memory that monitors the instruction cache index and tries to predict which instruction cache index should be accessed next, based on branch history.

Optimizing the actual algorithm used in retaining the history of each entry is an area of ongoing research. When a branch is incorrectly predicted, the speculative state of the machine must be flushed and fetching restarted from the correct place. This process is referred to as branch recovery. Speculation is the technique of guessing which way a program will proceed, and executing down that path. Speculation implies a method of correction when a guess is determined to be wrong.

Difficulties arise in computer systems that employ a memory hierarchy and which attempt to take advantage of the parallelism present in a program by executing instructions based on data dependencies and resource availability. These types of machines are referred to as "out-of-order" computing machines. The term "out-of-order" means not necessarily executed in the same sequence implied by the source program. What can happen is that when an access misses the instruction cache, the computer's CPU issues a fetch to the external memory of the system. The problem in out-of-order machines, however, is that accesses can be returned in arbitrary order. Moreover, there exists a further problem in keeping track of pending requests from the external memory system in the face of mispredicted branches. In most cases, the external memory systems have no way of knowing that a memory access was canceled due to a mispredicted branch.

As will be seen, the present invention provides a method of prefetching using M physical streaming buffers having N logical identifiers, where N is greater than M. These physical buffers are renamed when an instruction stream is redirected. The invention provides numerous advantages in computer performance; especially in computer systems employing out-of-order execution engines.

SUMMARY OF THE INVENTION

A mechanism for streaming buffer renaming in a computer system employing a memory hierarchy which includes cache memories is disclosed. The streaming buffers utilized in conjunction with the present invention function as placeholders for memory accesses issued by a microprocessor to an external memory via a system bus. When a fetch within the processor misses the instruction cache, the fetch address is placed in the streaming buffer. The streaming buffer has M physical buffers associated with N virtual identifiers, where M and N are integers and where M is less than N. Up to N fetch accesses may be outstanding on the external bus at any time.

When the data has been fetched externally, it is returned into the streaming buffer into one of the M physical locations. The data within the streaming buffer is returned to the instruction cache of the processor only if it is to be used in accordance with the computer program being executed.

One of the salient features of the present invention is that renaming of the physical buffers using a plurality of virtual identifiers obviates the need to wait for data to be returned before issuing a new access in the event of a branch misprediction.

BRIEF DESCRIPTION OF THE DRAWINGS

The present invention will be understood more fully from the detailed description which follows and from the accompanying drawings, which, however, should not be taken to limit the invention to the specific embodiments shown, but rather are provided for explanation and understanding only.

FIG. 5 illustrates the organization and contents of one entry in the instruction streaming buffer.

FIG. 6 illustrates the virtual identification translation buffer utilized in one embodiment of the present invention.

DETAILED DESCRIPTION

The computer system of the present invention is described in conjunction with a particular embodiment, which embodiment includes a processor capable of executing instructions out-of-order; that is, not necessarily in the sequence implied by the source program. For example, in such a computer system, loads can pass loads and accesses to external memory can come back in arbitrary order. Practitioners in the art will no doubt appreciate, however, that the invention is well-suited for computer systems other than the particular embodiment described below.

Figure 1:
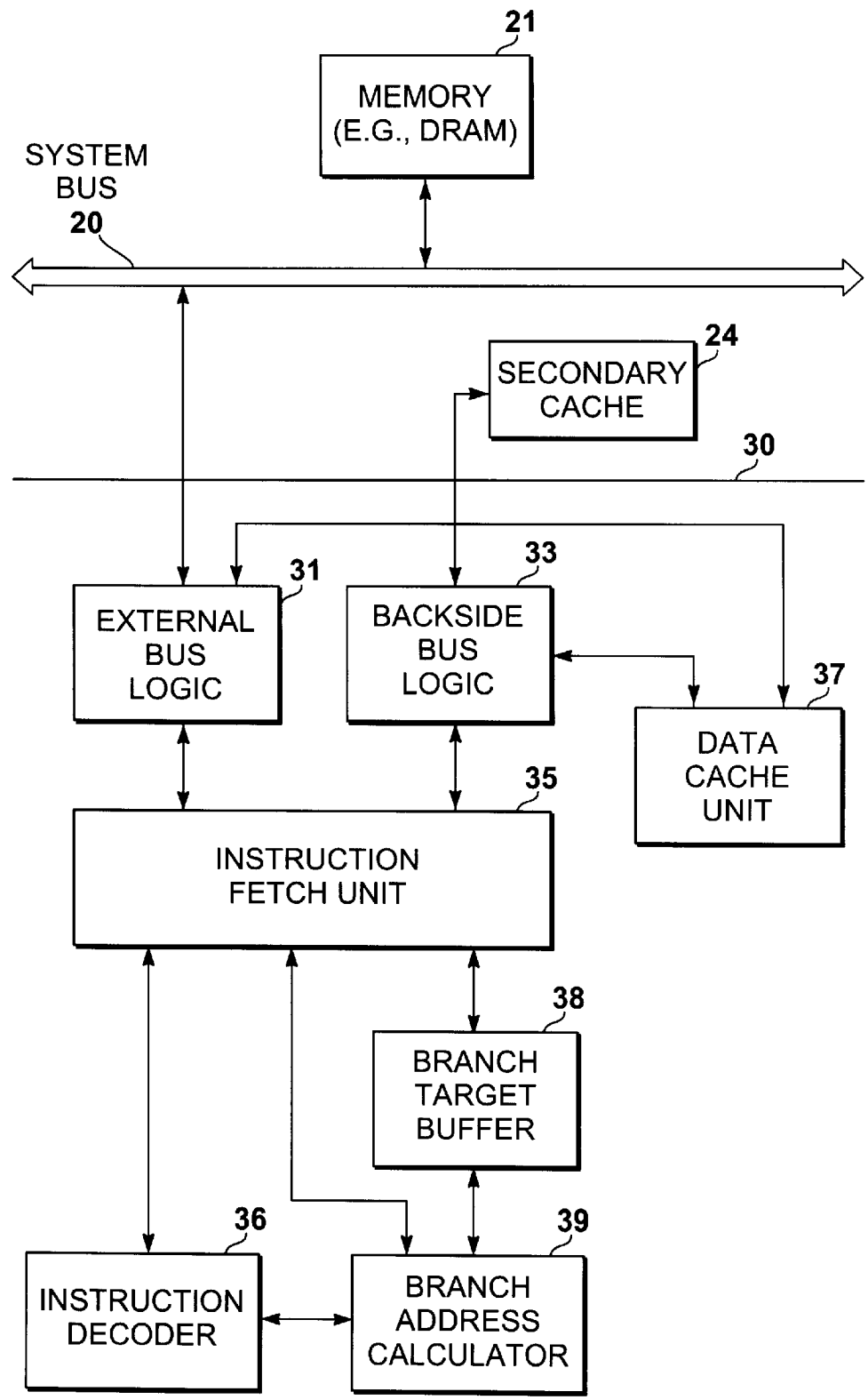
FIG. 1 is a general block diagram of the computer system of the present invention.

The computer system of the present invention is shown generally in FIG. 1 as including a system bus 20 coupled to a main memory 21, which may comprise ordinary dynamic random-access memory (DRAM). Also coupled to system bus 20 is processor 30, which preferably comprises a single integrated circuit. Normally, system bus 20 interfaces with processor 30 through an external bus logic (EBL) unit 31. In the embodiment shown in FIG. 1, a secondary cache 24 is coupled to a backside bus logic (BBL) 33.

Both external bus logic unit 31 and backside bus logic unit 33 are coupled to instruction fetch unit (IFU) 35 to service data instruction fetches required by processor 30. External bus logic unit 31 manages transfers of data to and from the external world via system bus 20. It also manages cache coherency transfers. Backside bus logic unit 33 is a functional unit that controls cache memory and cache coherency transactions to and from processor 30 and secondary cache 24.

Note that although FIG. 1 illustrates secondary cache 24 being disposed external to processor 30 (fabricated as a separated integrated circuit) in other embodiments, secondary cache 24 may be incorporated on the same substrate as processor 30. In still other embodiments, secondary cache 24 may be optionally eliminated, substituted with another memory element, or coupled directly to system bus 20. It is appreciated that a variety of memory hierarchy architectures may be utilized in conjunction with the present invention.

As explained earlier, in one embodiment, the processor of the invented computer system utilizes a speculative out-of-order execution engine. The basic speculative engine is organized into an "in-order" portion which includes an instruction fetch unit (IFU) incorporating an instruction cache and an instruction translation look-aside buffer (ITLB). The in-order part also includes an instruction decoder (ID). This part of the machine takes the input from the user program instruction stream and emits an data flow representation of that instruction stream. The out-of-order portion of the processor accepts the data flow stream and schedules execution units depending on data dependencies and resource availability. Results are temporarily stored for these speculative executions. Finally, the temporary, speculative results are committed to a permanent, architectural state as part of a retirement process that re-institutes the in-order sequence of the original user program.

With continuing reference to FIG. 1, instruction fetch unit 35 is responsible for efficiently supplying instructions to instruction decoder 36. When a fetch misses the instruction cache, instruction fetch unit 35 communicates with EBL unit 31 and BBL unit 33 to access the required instruction or instructions from the memory hierarchy. Instructions are "streamed" for cache miss rate reduction in accordance with the present invention. In a current embodiment, streaming buffer renaming allows up to four instruction fetch unit fetches to be outstanding at any one time even though only two physical streaming buffers are currently employed. This aspect of the present invention will be described in more detail shortly.

As shown in FIG. 1, instruction fetch unit 35 has significant interactions with external bus logic unit 31, backside bus logic unit 33, instruction decoder 36, branch target buffer (BTB) 38, and branch address calculator (BAC) 39. Instruction fetch unit 35 sends external instruction fetch requests to EBL 31, and receives instruction bytes from EBL 31 or BBL 33—which in turn gets those bytes from either secondary cache 24 or external memory 21 via system bus 20. Eventually, the fetched instructions are delivered to instruction decoder 36. Branch predictions are provided by branch target buffer 38 and branch address calculator 39.

Branch mispredictions are provided by the integer execution unit of the processor (not shown in FIG. 1) as well as branch address calculator 39. These predictions/mispredictions are used by IFU 35 to determine the address of the next cache access. Instruction fetch unit 35 receives page table entries from a page mishandler incorporated into processor 30 to service misses to the instruction translation look-aside buffer.

Figure 2:
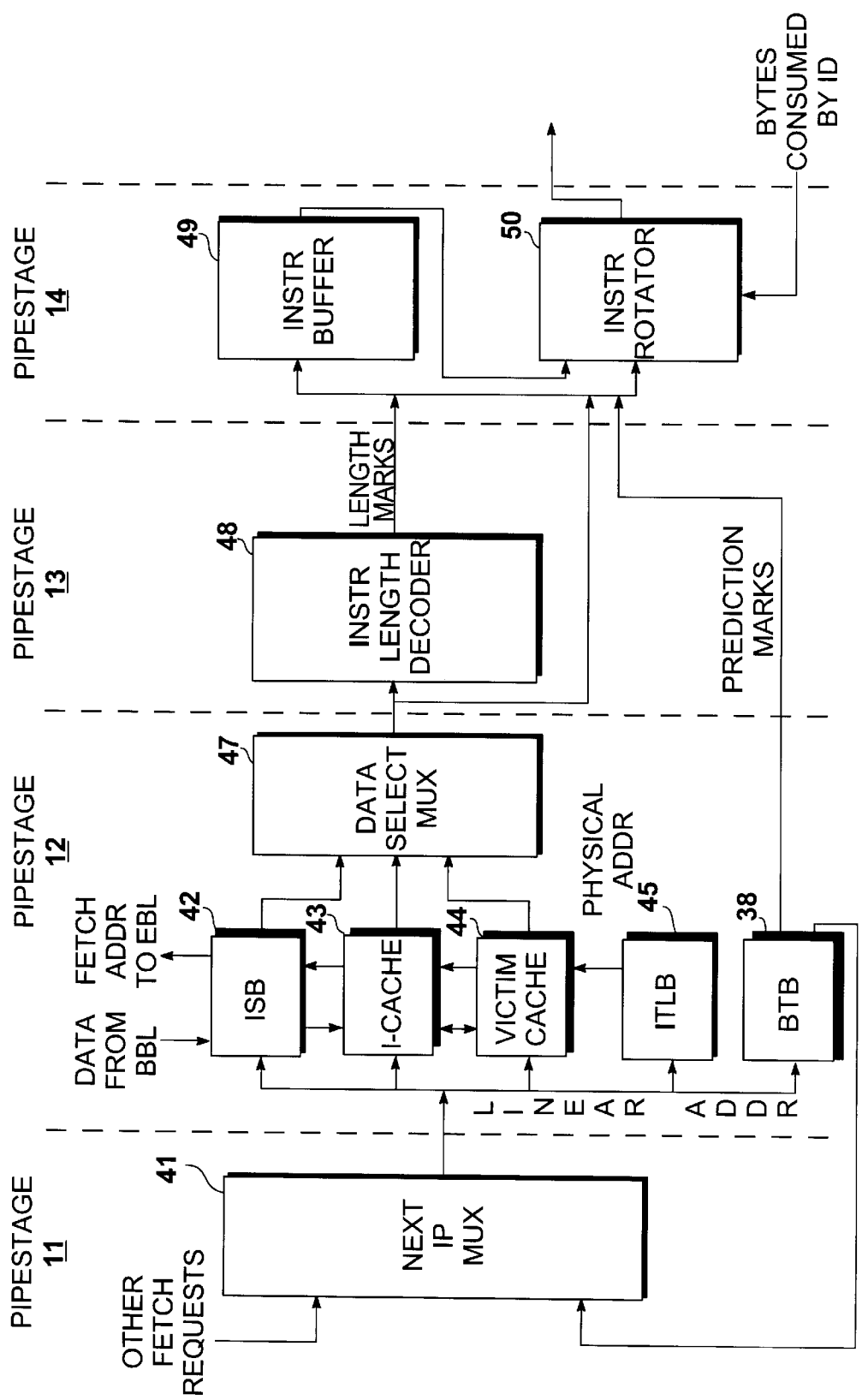
FIG. 2 illustrates the pipestages of the instruction fetch unit in accordance with one embodiment of the present invention.

FIG. 2 illustrates the four pipestages of instruction fetch unit 35. In the first pipestage 11, the instruction fetch unit selects the address of the next cache access. This address is selected from a number of competing fetch requests by the next instruction pointer logic unit 41. Unit 41 typically includes a multiplexer or some similar logic element for handling the selection process. These requests arrive at IFU 35 from BTB 38, BAC 39 and the integer execution unit within processor 30.

Instruction fetch unit 35 selects the fetch request with the highest priority and schedules it for service by the next pipestage, pipestage 12. In pipestage 12, IFU 35 accesses its many caches/buffers using the fetch address selected by the previous stage, i.e. pipestage 11. Among the caches/buffers accessed are the instruction cache (I-CACHE) 43, the instruction victim cache (IVC) 44 and the instruction streaming buffer (ISB) 42. Victim cache 44 catches instruction cache entries that have been expelled from instruction cache 43 due to replacements. The purpose of a victim cache 44 is to store these evicted instructions in the event that the data is immediately needed again a short while later.

During operation of instruction fetch unit 35, if there is hit to any one of the caches/buffers, instructions are read out and forwarded to the next pipestage, pipestage 13. However, if the selected request misses all of the buffers, an external fetch is initiated by sending a request to external bus logic unit 31. Two other caches that are also accessed during pipestage 12 using the same fetch address are the instruction translation look-aside buffer (ITLB) 45 and the branch target buffer (BTB) 38. The purpose of the ITLB access is to obtain the physical address of the fetch. The purpose of the BTB access is to obtain a branch prediction.

In pipestage 13, instruction fetch unit 35 marks the instruction received from the previous pipestage 12. Marking is the process of determining instruction boundaries and identifying invalid instruction bytes. Additional marks for predicted branches are delivered by BTB 38 by the end of pipestage 13. Note that a data selection multiplexer 47 is used to couple data from the caches/buffers of instruction fetch unit 35 to the instruction length decoder (ILD) 48 which produces length marks.

Finally in pipestage 14, the instructions and marks are written into an instruction buffer 49 and, optionally, also delivered to instruction decoder 36, if the instruction buffer is partially or fully empty. Note that the output of buffer 49 is coupled to an instruction rotator 50.

It should be understood that the fetch address selected in pipestage 11 for service in pipestage 12 is a linear address, and not a virtual or physical address in accordance with a current embodiment of the present invention. This allows instruction fetch unit 35 to prefetch past segment boundaries while delaying the checking of segmentation related violations to units downstream from IFU 35 in the pipeline.

As described previously, instruction cache 43, instruction streaming buffer 42 and instruction victim cache 44 are accessed in parallel. The linear fetch address used for accessing these three caches/buffers is selected by Next IP logic unit 41 based on inputs from BTB 38, BAC 39, and the execution units of processor 30. However, since all three structures have virtual tags, address translation is necessary and provided by ITLB 45. On a hit to one of the three caches/buffers, sixteen instruction bytes are read out from the cache/buffer that was hit.

In the event that there is a miss to each of the three caches/buffers, instruction streaming buffer 42 initiates miss processing by sending an external fetch request to the external bus logic unit 31. Miss data returns to instruction streaming buffer 42 from BBL unit 33 over an 8-byte data bus. Cache returns are written from the streaming 42 buffer to instruction cache 43 over a cache line wide replacement bus. Also, on a miss to instruction cache 43, a victim line is identified for replacement and saved to victim cache 44 over a victim save bus. A victim restore bus returns a victim line to the instruction cache whenever a hit occurs in instruction victim cache 44.

Because the victim cache 44, instruction streaming buffer 42, and instruction cache 43 are accessed in parallel, eight possible scenarios for hits/misses exists in the current embodiment of the present invention. These scenarios are listed in Table 1 below.

TABLE 1

| CASE | ICACHE | IVC | ISB | OPERATION |
| --- | --- | --- | --- | --- |
| 1 | Hit | Miss | Miss | Data from ICACHE; simple ICACHE hit. |
| 2 |  | Hit | Miss | This case does not occur. |
| 3 |  | Miss | Hit | Data from ICACHE; Invalidate entry hit in ISB; duplicate hit. |
| 4 |  | Hit | Hit | This case does not occur. |
| 5 | Miss | Miss | Miss | Move victim to IVC; allocate entry in ISB and initiate miss processing; true miss. |
| 6 |  | Hit | Miss | Data from IVC; move victim to IVC; move IVC entry hit to victim in ICACHE. |
| 7 |  | Miss | Hit | Data from ISB; move victim to IVC; simple stream buffer hit. |
| 8 |  | Hit | Hit | Data from IVC; move victim to IVC; move IVC entry hit to victim in ICACHE; invalidate entry hit in ISB; duplicate hit. |

Note that simultaneous hits in the instruction cache and the victim cache are guaranteed not to occur for two reasons: 1) victim cache 44 contains lines expelled from instruction cache 43; and 2) on a hit to victim cache 44, the line is simultaneously written into instruction cache 43 and invalidated in victim cache 44. (Table 1 expresses this by the verb MOVE, rather than COPY, for transfers between instruction cache 43 and victim cache 44.) A MOVE copies the source to the destination and also invalidates the source, leaving only single copy of the data item in IFU 35.

In accordance with the present invention, instruction streaming buffer 42 serves as a placeholder which keeps track of all pending accesses. External memory returns data along with an identifier (an access tag) associated with the result. In a current implementation, streaming buffer 42 comprises two physical buffers having four logical identifiers. When a physical buffer needs to be allocated, an associated logical identifier is also allocated. Outstanding requests are tracked using logical identifiers.

Figure 8:
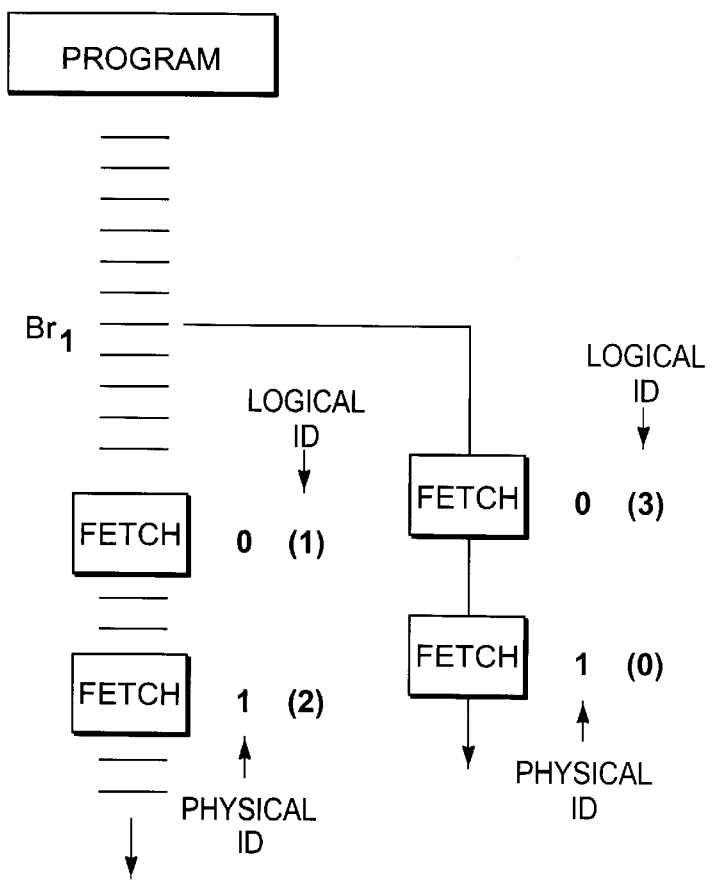
FIG. 8 is an exemplary program sequence flow illustrating the operation of the present invention.

To better understand the present invention, consider the example program sequence of FIG. 8. In the instruction stream of FIG. 8, fetches along one path are allocated to physical streaming buffers 0 and 1, which have been tagged with logical identifiers 1 and 2, respectively. Assuming that these fetches are outstanding on system bus 20, if it is determined that the earlier branch, $Br_1$, is to take the program flow in a different direction, then the fetches associated with that branch are assigned logical identifiers 3 and 0, corresponding to physical buffer locations 0 and 1, respectively.

Without the concept of streaming buffer renaming, if the program sequence flows down a mispredicted branch, the computer system would have to wait until one of the accesses came back. However, the present invention permits control flow change without a performance penalty. That is, the mechanism of the present invention allows the processor to immediately proceed down the correct path without waiting for completion of incorrect accesses or streams.

Returning to the example of FIG. 8, assume that branch $Br_1$ is the correct branch. When the memory subsystem returns the logical identifier 1, the physical buffer simply discards the information since the physical buffers have a field which identifies the logical identifier they are currently servicing. This means that when an access returns from external memory, the physical buffer compares the logical identifier associated with the result to the logical identifier currently assigned to the corresponding physical buffer. Data is only returned to the instruction cache from the streaming buffer if it is to be used.

Figure 3:
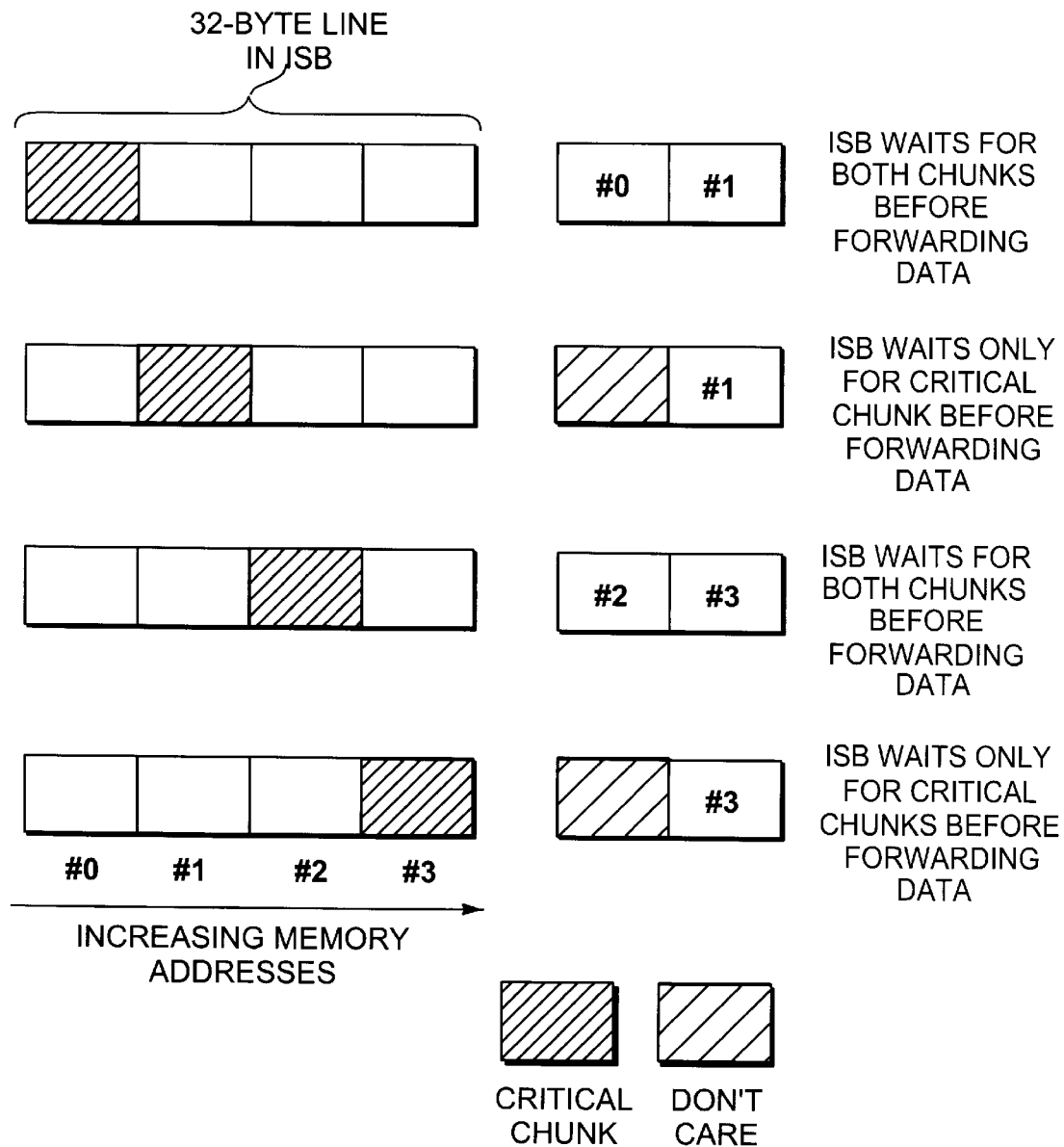
FIG. 3 illustrates forwarding of data from the instruction streaming buffer in accordance with one embodiment of the present invention.

Forwarding of data from instruction streaming buffer 42 is illustrated in FIG. 3. On a true data cache miss (a miss to all three caches/buffers) miss processing is initiated by allocating an entry in instruction streaming buffer 42 and signaling EBL 31 to begin an external fetch. Miss data is returned to streaming buffer 42 from BBL 33 in 8-byte chunks, but is forwarded to the next instruction fetch unit pipestage in 16-bit chunks. The data chunks are first written into one of the physical streaming buffers then forwarded to instruction cache 43.

The critical chunk shown in FIG. 3 is the chunk in which the fetch address lies. This chunk is always returned first by BBL 33. The order in which other chunks are returned depends on whether the data is returning from secondary cache 24 or external memory 21 for the embodiment of FIG. 1. When miss processing is complete (all four chunks are in streaming buffer 42 and BBL 33 has relinquished the instruction streaming buffer entry) the stream buffer entry becomes a candidate for writing to instruction cache 43 if it is marked ACCESSED. The actual writing of the instruction cache occurs the next time the cache is idled, e.g., in the clock cycle following the next true miss. Writing takes exactly one clock cycle and deallocates the corresponding source entry in the streaming buffer, thereby freeing it for future use.

As explained earlier, streaming buffer 42 is accessed in pipestage 12 in parallel with instruction cache 43 and victim cache 44. Streaming buffer 42 has a dual function: it serves as a line file buffer for instruction cache replacements, and it prefetches instructions from the current instruction stream. This latter function provides a powerful way to reduce the effective instruction cache miss rate by anticipating what the processor needs next. An important distinction from prior art prefetchers is that the present invention avoids instruction cache pollution by updating instruction cache 43 only if the prefetch and instructions are actually delivered to pipestage 13.

The instruction streaming buffer 42 resides between instruction cache 43 and the EBL/BBL logic circuitry in a current embodiment. On a true miss, miss processing is initiated by allocating an entry in the streaming buffer and issuing a fetch request to EBL 31. An external fetch initiated due to a true miss is referred to as a "demand fetch". Streaming buffer 42 is also capable of initiating another type of external fetch known as an "opportunistic fetch", which is issued whenever the streaming buffer sees an opportunity to fetch the next line from the current instruction stream. The current instruction stream is defined by the latest demand fetch. For example, if a demand fetch occurs to line K, the streaming buffer will attempt to fetch line K+1 as soon as the request to fetch line K has been accepted by EBL 31. Note that line K is written to instruction cache 43 since it was fetched on actual demand; however, since line K+1 was fetched opportunistically it is written to instruction cache 43 only if it is hit by an access.

FIG. 5 illustrates the organization and contents of instruction streaming buffer 42 for one embodiment of the computer system of the present invention. FIG. 5 illustrates a single physical entry, although in a current embodiment, two entries—which are exactly the same—are employed. Each entry is capable of storing a 32-byte cache line and has a 31-bit address tag. The 31-bit tag is comprised of a 24-bit physical tag and a 7-bit set address. In addition, each entry also has an address valid (AV) bit, four data valid bits (DV0–3), a request type bit (RT), an accessed bit (Acc), a snoop bit (Snp) and a 4-bit victim way (VW) field.

The AV bits indicate that the address tag of that entry is valid. The DV bits indicate which 8-byte data chunks in that entry are valid, i.e., which have been filled by BBL 33. The RT bit indicates the type of fetch request associated with that entry: demand (0) or opportunistic (1). The Acc bit indicates that the entry was either allocated due to a demand fetch or was hit by an access. The Acc bit is used to determine if an entry qualifies for writing to the instruction cache. The Snp bit indicates that the entry was hit by a snoop. Finally, the VW field is used to select the way in instruction cache 43 that the entry will be written to.

As explained earlier, entries in streaming buffer 42 are assigned physical identifiers 0 and 1. In order to create the illusion that there are more physical streaming buffer entries than simply these two physical entities, logical or virtual identifiers are used. A virtual identification translation buffer (VITB) is utilized to manage the relationship between virtual and physical stream buffer ID's. The VITB utilized in the current embodiment of the present invention is illustrated in FIG. 6.

The VITB is a TLB-like structure that translates stream buffer virtual ID's into physical ID's. It has four entries; however, it is appreciated that other embodiments may utilize more entries. The only limitation in accordance with the present invention is that the number of virtual or logical ID's should be greater than the actual physical entries of the streaming buffer. Each entry in the VITB consists of a valid bit, a busy bit and physical ID. The valid bit of an entry in the VITB indicates that the entry contains a valid virtual-to-physical translation. At most, two entries in the VITB can be valid at any given time since there are only two physical entries in the streaming buffer. The busy bit of an entry indicates that a fetch request has been issued to EBL 31 against the virtual ID corresponding to that entry, and that the virtual tag has not yet been relinquished by EBL 31. It is important to note that all four entries in the VITB may be simultaneously busy, implying that up to four instruction fetches may be outstanding in EBL 31 at any given time.

The virtual ID mechanism used to rename streaming buffer entries is especially useful for improving instruction fetch unit performance in the presence of branch mispredictions. Any instruction fetch request made by IFU 35 to EBL 31 is accompanied by a virtual stream buffer ID, which in turn is associated with a physical stream buffer ID through the VITB. EBL 31 and EBL 33 use the virtual stream buffer ID to identify the instruction fetch units' requests, and also to attach to the data that is returned to IFU 35. Instruction fetch unit 35 utilizes the virtual ID accompanying the data to look into the VITB and determine the physical stream buffer entry in which to write the data.

Due to branch mispredictions, IFU 35 may find that the fetch requests it has already issued to EBL 31 are no longer needed. Rather than cancel such unneeded requests and wait for the unneeded requests to complete before issuing the real request (increased branch misprediction penalty), IFU 35 assigns a new virtual ID in an allocable physical entry and makes the proper request immediately. This operation is illustrated in the example of FIG. 8. The VITB is updated to reflect a new fetch request; the valid and busy bits of the free virtual ID used are set; and the physical ID of the entry used is written into the PID field of the VITB entry. At the same time, IFU 35 unmaps the virtual ID previously associated with the physical entry by clearing its valid bit in the VITB. The busy bit is left untouched to insure that the unmapped virtual ID is not reused until such time that the unneeded fetch has been completed. Unmapping the old virtual ID insures that data returning to the IFU with that virtual ID will be discarded.

Thus, the invention is valuable in situations where there exists a change in direction of control flow—and that change is implicitly taken by the program in a sequence which is not necessarily the same as that of the source program. Practitioners in the field of microprocessor design will appreciate that there are several sources of redirection since there are numerous ways in which the front end of a computer machine can change the direction that it was fetching its instructions.

Figure 4:
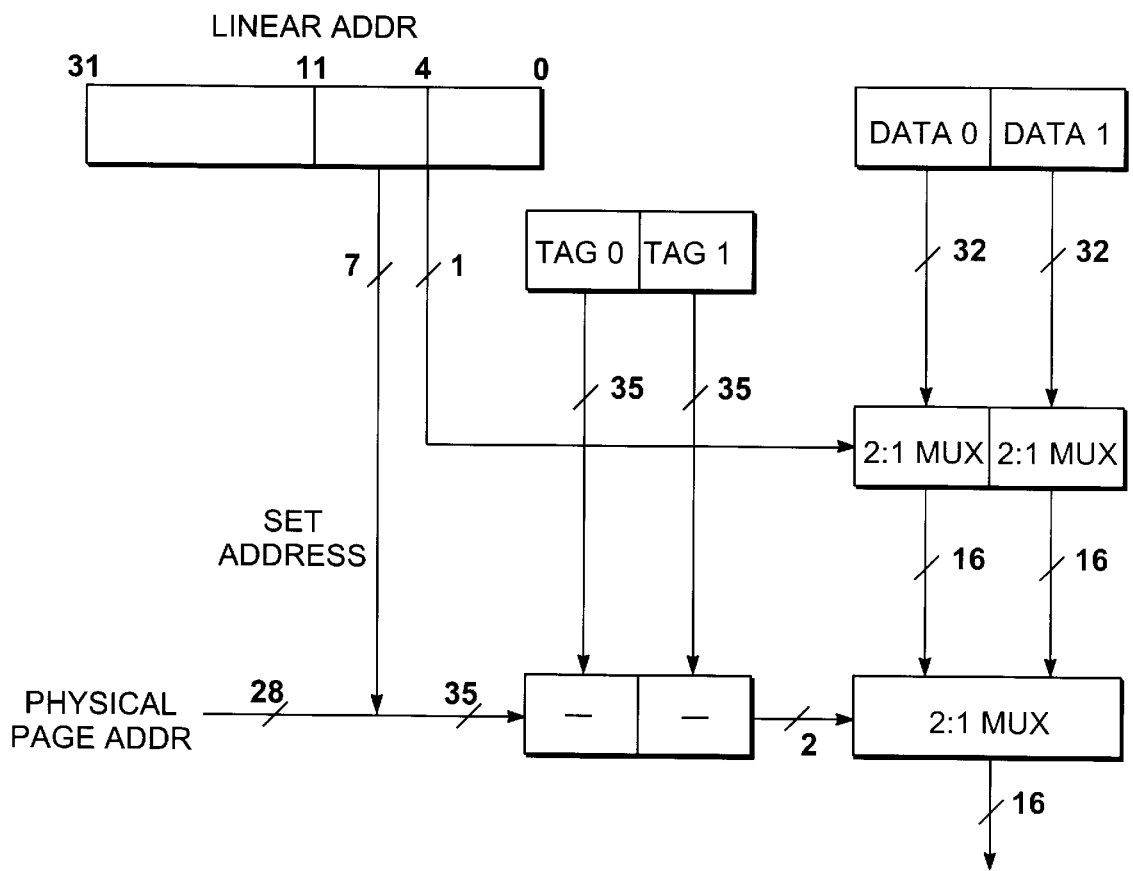
FIG. 4 illustrates tag comparison for one embodiment of the streaming buffer utilized in the computer system of the present invention.

Streaming buffer 42 is accessed for reading in pipestage 12 in parallel with instruction cache 43 and victim cache 44. Since streaming buffer 42 is fully associative, the tags of both stream buffer entries are compared with the physical fetch address. A 31-bit compare is required since both the physical page address and the set address must be compared. This is illustrated in FIG. 4. If there is a match and the AV bit is set, and the required data is present in the streaming buffer, a stream buffer hit is signaled. The data required to be present for a hit is reckoned as described earlier in conjunction with FIG. 3.

On a simple stream buffer hit data is forwarded to pipestage 13 and the Acc bit of the entry is set. Further, if the entry hit is opportunistic (as indicated by its RT bit) the VW field of the entry is updated and its RT bit is set to demand. If there are concurrent hits to instruction cache 43 or victim cache 44 (e.g., not a simple stream buffer hit), the entry hit in the stream buffer is invalidated by clearing its AV bit. Such an entry is not written into instruction cache 43.

Figure 7:
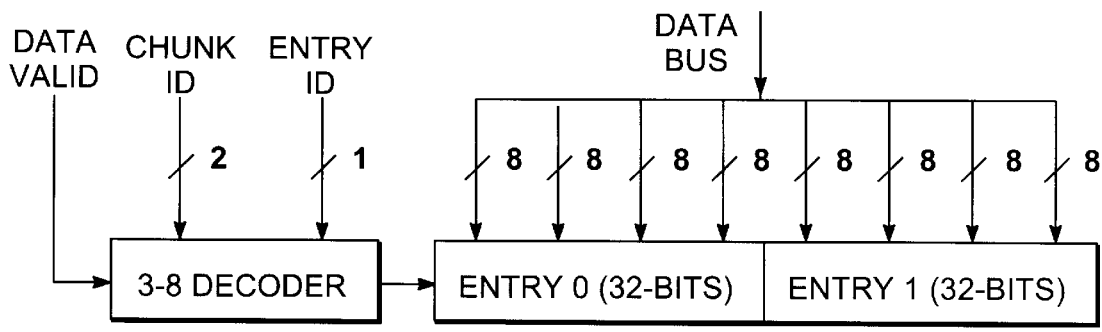
FIG. 7 illustrates the process of writing to the instruction streaming buffer in one embodiment of the present invention.

As previously discussed, external fetch requests made by IFU 35 are accompanied by the virtual ID of the streaming buffer entry allocated for that particular request. EBL 33 attaches this virtual ID to each 8-byte chunk of data it returns to streaming buffer 42. This allows the streaming buffer to determine where (which physical entry) to write the data by searching the VITB. Since there are four entries in the VITB, 2-bit virtual ID's are necessary. Each chunk of data returned by the BBL is also accompanied by a 2-bit chunk ID that is used by streaming buffer 42 to write the appropriate chunk in the physical entry. This generalized mechanism of chunk ID's and stream buffer virtual ID's allows BBL 33 to return chunks out-of-order and even to interleave chunks of different fetch requests. Note that up to four IFU fetches (one per virtual ID in the VITB) may be outstanding at any time. FIG. 7 illustrates the process writing to streaming buffer 42. When BBL 33 has returned all four chunks corresponding to a stream buffer virtual ID, and no longer needs that ID, it clears the busy bit of that corresponding entry in the VITB. This indicates to IFU 35 that the virtual ID is free and may be reused.

Opportunistic fetching accomplishes the instruction streaming function of the streaming buffer 42. When there is an allocable entry and no simultaneous demand fetch request, stream buffer 42 issues an opportunistic fetch to the next consecutive line in the current stream. The current stream is defined by the most recent demand fetch. Opportunistic fetching is disabled following a purge of IFU 35, concurrent hits in the streaming buffer and either the instruction cache or victim cache, or an uncacheable demand fetch. Opportunistic fetching is re-enabled following the next cacheable demand fetch request (i.e., the next true miss).

We claim:

1. A computer system for executing a computer program comprising:

a system bus;

a memory coupled to said system bus;

an instruction cache storing frequently referenced instructions to be executed in said computer program;

a logic unit managing transfer to/from said memory via said system bus;

an instruction streaming buffer (ISB) coupled to said instruction cache and said logic unit, said ISB having M physical buffers associated with N virtual identifiers, where M and N are integers and M is less than N;

said ISB sending external fetch requests to said logic unit to fetch instructions from said memory, each external fetch request being assigned a virtual identifier corresponding to a physical buffer, said physical buffer being renamed with a different virtual identifier for a new external fetch request in the event of a branch misprediction; and wherein said ISB forwards data returned by each said fetch request to said instruction cache only if said data is to be used by said computer program.

2. The computer system of claim 1 further comprising an instruction fetch unit (IFU) coupled to said instruction cache, logic unit and ISB for fetching instructions to be executed in accordance with said computer program.

3. The computer system of claim 2 further comprising a translation buffer containing the virtual-to-physical translations of said ISB.

4. The computer system of claim 2 wherein said instruction cache, ISB and IFU are contained on a single integrated circuit comprising a processor.

5. The computer system of claim 4 further comprising a secondary cache memory coupled to said processor, said secondary cache memory being coupled to said logic unit.

6. The computer system of claim 5 further comprising a translation buffer containing the virtual-to-physical translations of said ISB.

7. The computer system of claims 1, 2, 3, 4, 5 or 6 wherein said translation buffer comprises M entries with each entry containing a first bit indicating a valid virtual-to-physical translation.

8. The computer system of claim 7 wherein said translation buffer further comprises a second bit indicating that a fetch for a particular entry has been issued to said logic unit against the virtual identifier corresponding to said particular entry.

9. The computer system of claim 8 wherein M is equal to 2 and N is equal to 4.

10. A computer system comprising:

a microprocessor having a pipeline for speculatively executing a program;

a memory;

an external bus coupling said memory to said microprocessor;

said microprocessor including an instruction fetch unit (IFU) for fetching instructions to be executed for said program, and a bus logic unit communicating with said IFU and said external bus;

said IFU sending an external fetch request to said bus logic unit to fetch an instruction from said memory via said external bus, said IFU further comprising an instruction streaming buffer (ISB) including M physical buffers having N virtual identifiers, where M and N are integers and M is less than N, said ISB tracking up to N outstanding fetch requests of said IFU by allocating a virtual identifier to a physical buffer for each said outstanding fetch request, said physical buffer being renamed with a different virtual identifier in the event of a mispredicted branch; and wherein data returned to said ISB for each said fetch request is forwarded to said IFU only if it is to be used by said program.

11. The computer system of claim 10 wherein said IFU comprises an instruction cache coupled to said ISB for receiving data forwarded by said ISB.

12. The computer system of claim 11 wherein said IFU further comprises a victim cache coupled to said instruction cache, said victim cache saving data expelled from said instruction cache.

13. The computer system of claim 10 wherein said ISB further comprises a translation buffer containing the virtual-to-physical translations of said ISB.

14. The computer system of claim 10 wherein said instruction cache, ISB and IFU are integrated on the same silicon substrate as said microprocessor.

15. The computer system of claim 14 further comprising a secondary cache memory coupled to said microprocessor, said secondary cache memory being fabricated on a separate integrated circuit.

16. The computer system of claim 15 further comprising a translation buffer containing the virtual-to-physical translations of said ISB.

17. The computer system of claim 12 wherein IFU selects a fetch address of a next cache access in a first pipestage of said pipeline.

18. The computer system of claim 17 wherein said IFU accesses said ISB, instruction cache, and victim cache in parallel in a second pipestage of said pipeline using said fetch address.

19. The computer system of claim 18 wherein said fetch address is a linear address.

20. The computer system of claim 18 wherein during said second pipestage of said pipeline, in the event that said fetch address misses said ISB, instruction cache, or victim cache, said IFU sends said external fetch request to said bus logic unit.

21. The computer system of claims 10, 11, 12, 13, 14, 15, 16, 17, 18, 19 or 20 wherein said translation buffer comprises M entries with each entry containing a first bit indicating a valid virtual-to-physical translation.

22. The computer system of claim 21 wherein said translation buffer further comprises a second bit indicating that a fetch for a particular entry has been issued to said logic unit against the virtual identifier corresponding to said particular entry.

23. The computer system of claim 22 wherein M is equal to 2 and N is equal 4.

24. A computer system comprising:
a microprocessor having a pipeline for speculatively executing a program;
a memory;
a bus coupling said memory to said microprocessor;
said microprocessor including an instruction fetch unit (IFU) for fetching instructions to be executed for said program, a mechanism coupled to said IFU providing branch prediction information, and a bus logic unit communicating with said IFU and said bus;

said IFU sending a fetch request to said bus logic unit to fetch an instruction from said memory via said bus, said IFU further comprising an instruction streaming buffer (ISB) including M physical buffers having N virtual identifiers, where M and N are integers and M is less than N, said ISB tracking up to N outstanding fetch requests of said IFU by allocating a virtual identifier to a physical buffer for each said outstanding fetch request, said IFU assigning a new virtual identifier to said physical buffer in the event of a mispredicted branch; and wherein data returned to said ISB for each said fetch request is forwarded to said IFU only if it is to be used by said program.

25. The computer system of claim 24 wherein said IFU comprises an instruction cache coupled to said ISB for receiving data forwarded by said ISB.

26. The computer system of claim 25 wherein said ISB further comprises a translation buffer that translates said N virtual identifiers into said M physical buffers, said translation buffer having M entries with each entry containing a first bit indicating a valid virtual-to-physical translation.

27. The computer system of claim 26 wherein an entry of said translation buffer further includes a second bit indicating that a pending fetch request has been issued to said bus logic unit against a virtual identifier corresponding to said entry.

28. The computer system of claim 24 wherein said memory comprises a secondary cache memory.

29. The computer system of claim 24 wherein M is equal to 2 and N is equal 4.

30. A computer system comprising:
an out-of-order computing machine that executes instructions of a program based on data dependencies and execution resource availability;
a main memory;
a first bus coupling said main memory to said out-of-order computing machine;
said out-of-order computing machine including an instruction fetch unit (IFU) for fetching instructions to be executed in said program, and a bus logic unit communicating with said IFU and said first bus;
said IFU sending a fetch request to said bus logic unit to fetch an instruction from said main memory via said first bus, said IFU further comprising an instruction streaming buffer (ISB) including M physical buffers having N virtual identifiers, where M and N are integers and M is less than N, said ISB tracking up to N outstanding fetch requests of said IFU by allocating a virtual identifier to a physical buffer for each said outstanding fetch request, said outstanding fetch requests being returned to said ISB in an arbitrary order.

31. The computer system of claim 30 further comprising circuitry coupled to said IFU providing branch prediction information, wherein said IFU assigns a new virtual identifier to said physical buffer in the event of a mispredicted branch.

32. The computer system of claim 31 wherein said IFU further comprises an instruction cache coupled to said ISB for receiving data forwarded by said ISB.

33. The computer system of claim 32 wherein said ISB further comprises a translation buffer that translates said N virtual identifiers into said M physical buffers, said translation buffer having M entries with each entry containing a first bit indicating a valid virtual-to-physical translation.

34. The computer system of claim 33 wherein an entry of said translation buffer further includes a second bit indicating that a pending fetch request has been issued to said bus logic unit against a virtual identifier corresponding to said entry.

35. The computer system of claim 30 further comprising:

a secondary cache memory:

a second bus coupling said secondary cache memory to said out-of-order computing machine; and wherein said out-of-order computing machine further includes a local instruction cache, said IFU sending said fetch request to said bus logic unit to fetch said instruction in response to a miss to said local instruction cache.

36. The computer system of claims 30, 31, 32, 33, 34, or 35 wherein M is equal to 2 and N is equal 4.

* * * * *